United States Patent [19]

Pohl

[11] Patent Number: 5,035,596

[45] Date of Patent: Jul. 30, 1991

[54] COEXTRUSION HEAD

[75] Inventor: Harald Pohl, Berlin, Fed. Rep. of Germany

[73] Assignee: Bekum Maschinenfabriken GmbH, Berlin, Fed. Rep. of Germany

[21] Appl. No.: 456,194

[22] Filed: Dec. 19, 1989

Related U.S. Application Data

[63] Continuation of Ser. No. 205,070, Jun. 10, 1988, abandoned.

[30] Foreign Application Priority Data

Jun. 22, 1987 [DE] Fed. Rep. of Germany ....... 3720560

[51] Int. Cl.⁵ .............................................. B29C 47/30
[52] U.S. Cl. ................................... 425/133.1; 264/166; 264/173; 425/191; 425/192 R; 425/461; 425/467
[58] Field of Search ................ 425/133.1, 133.5, 190, 425/376.1, 380, 381, 185, 186, 182, 184, 188, 191, 192, 461, 467; 264/166, 171, 173

[56] References Cited

U.S. PATENT DOCUMENTS

| | | | |
|---|---|---|---|
| 3,649,143 | 3/1972 | Papesh et al. | 425/114 |
| 3,694,292 | 9/1972 | Schippers et al. | 425/191 |
| 3,759,647 | 9/1973 | Schrenk et al. | 425/131 |
| 4,167,383 | 9/1979 | Murakami et al. | 425/462 |
| 4,185,954 | 1/1980 | Murakami et al. | 425/133.1 |
| 4,578,025 | 3/1986 | Ando et al. | 425/133.1 |
| 4,758,144 | 7/1988 | Becker | 425/133.1 |
| 4,761,129 | 8/1988 | Aste et al. | 425/133.1 |
| 4,838,778 | 6/1989 | Becker et al. | 425/133.1 |
| 4,889,477 | 12/1989 | Wortberg et al. | 425/133.1 |

FOREIGN PATENT DOCUMENTS

| | | | |
|---|---|---|---|
| 3532996 | 3/1987 | Fed. Rep. of Germany | |
| 49-28267 | 7/1974 | Japan | 425/133.1 |
| 62-58811 | 3/1987 | Japan | 425/462 |
| 62-191120 | 8/1987 | Japan | 425/131.1 |
| 2185931 | 8/1987 | United Kingdom | 425/133.1 |

Primary Examiner—Jay H. Woo
Assistant Examiner—Khanh P. Nguyen
Attorney, Agent, or Firm—Penrose Lucas Albright

[57] ABSTRACT

A coextrusion head for the continuous production of multilayer tubular structures having three to seven-layers. The basic tubular structure produced has a central barrier layer and symmetrically arranged thereabout, layers of adhesive agent, regenerated and/or carrier materials. The upper portion of the coextrusion head contains a multipiece jacket that defines annular passages in which the layers of the structure are formed. The lower portion contains the nozzle from which the tubular structure is extruded. Between the upper and lower portions are placed a core ring and a nozzle ring which together provide the transport channel between the annular passageway in which the layers are joined and the inlet to the nozzle. Each ring has two alternative configurations. One configuration permits movement of the layered material in the annular passageway where the layers are joined and the second configuration precludes such movement. By the proper combination of the jacket in the upper portion of the coextrusion head and core and nozzle rings, tubular structures having a center barrier layer and symmetrical inner and outer layers, an inner barrier layer with outer layers of other materials, or an outer barrier layer with inner layers of other materials may be formed. Additional flexibility in the formation of the tubular structures may be obtained by the manner in which the extruders are attached to the coextrusion head.

16 Claims, 2 Drawing Sheets

FIG. 1
FIG. 2
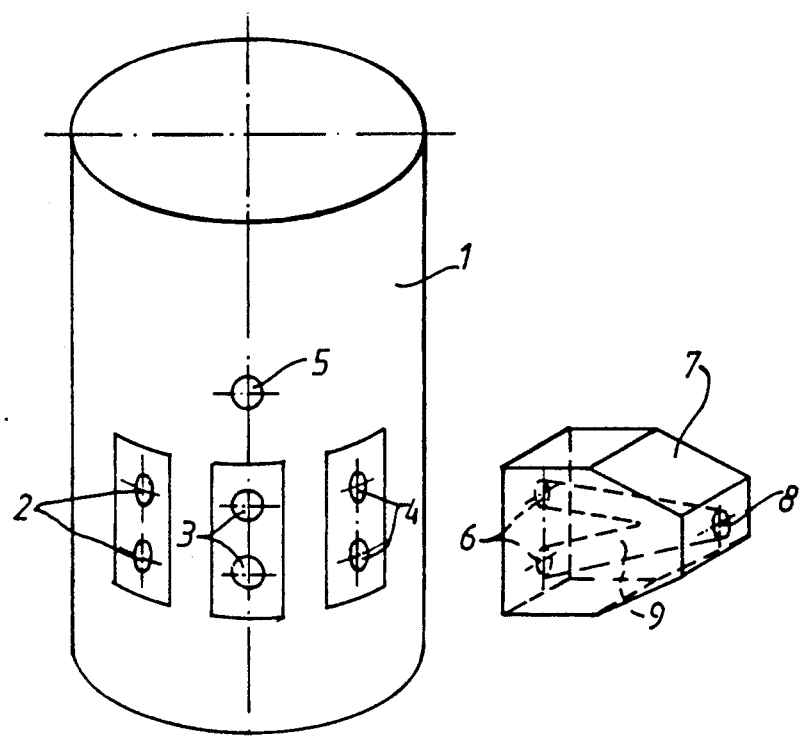
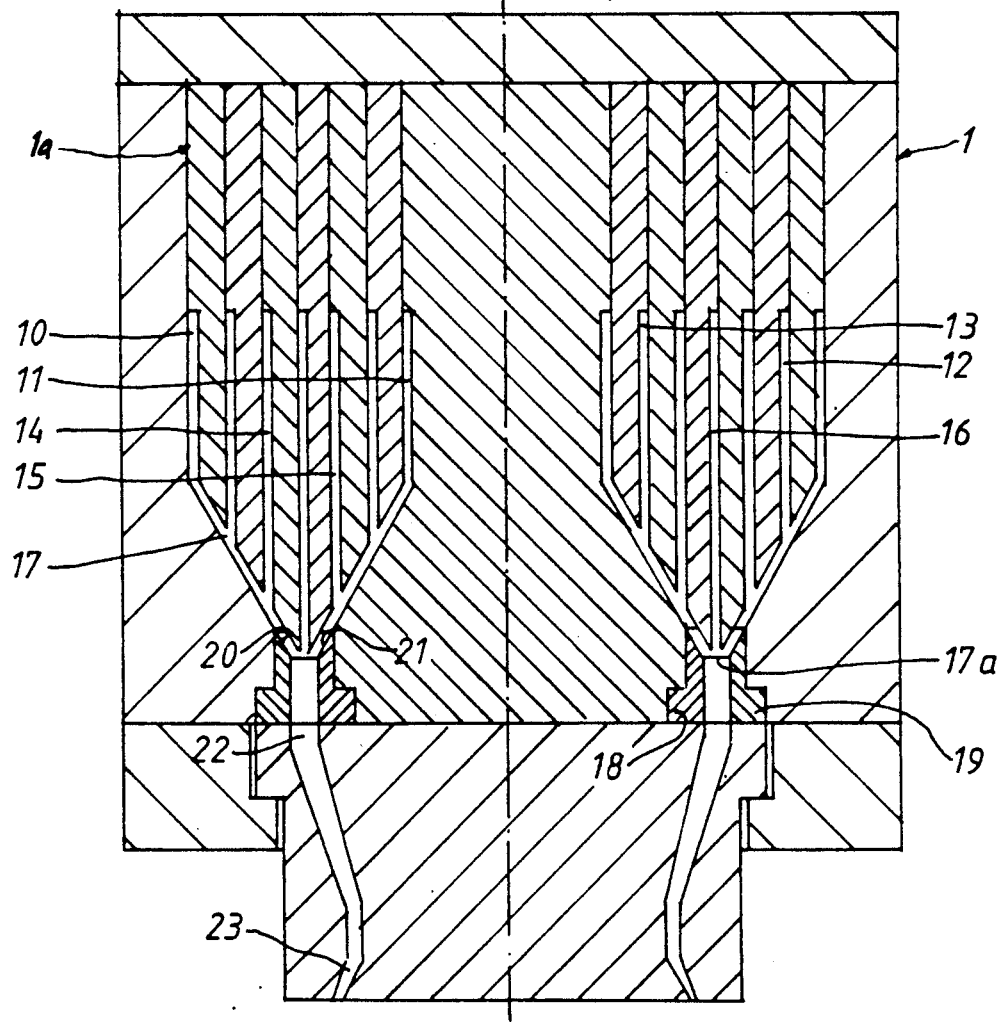

COEXTRUSION HEAD

RELATED APPLICATION

This is a continuation of application Ser. No. 07/205,070, filed June 10, 1988, now abandoned.

FIELD OF INVENTION

The invention relates to a means for the production of tubular structures having a maximum of seven layers, in the form of parison blanks, which are further processed by blow molding. The layers are formed within annular passages within the means, a coextrusion head, the passages being fed the plastic material through injection boreholes. The layers then are joined at the bottom end of a jacket, pieces of which define the annular passages, and are channeled to a nozzle as a multilayer tubular structure where the completed tubular structure is discharged.

BACKGROUND OF THE INVENTION

Multilayer tubular structures presently being manufactured, with few exceptions, have a symmetrical structure consisting of a middle barrier layer, adhesive layers, adjacent each side of the barrier layer, and outside carrier layers. Optionally, an additional regenerated material layer is introduced on one or both sides of the barrier layer, between the adhesive and carrier layers, or else the tubular structures produced consist of either the inside or outside part of the above described symmetrical structure, i.e., one having the barrier layer as the outside or the inside layer with the remaining layers consisting of an adhesive and carrier layer to one side or the other of the barrier layer. As the materials are first formed into individual tubular structures, each having a wall thickness that is maintained precisely to a fraction of a millimeter, it has been customary to use a separate coextrusion head, with associated extruder mechanism, for each type tubular structure being manufactured. This has been necessary because, with the different tubular structures, the carrier layer(s), adhesive layer(s), barrier layer and, when used, the regenerated material layer(s) are found at different positions within the tubular structure. This variation produces differing manufacturing considerations with respect to material characteristics thereby requiring different extruder apparatuses and feed passage configurations.

This requirement for a variety of extrusion heads and associated apparatuses raises the cost considerably, so that when small quantities are to be manufactured, coextrusion technology becomes uneconomical and, as a result, other conventional container products are preferred.

SUMMARY OF THE INVENTION

The object of the present invention is to develop a coextrusion head of a type such that all currently used tubular structures can be manufactured using the head without requiring a notable outlay for equipment and without requiring changes in the extruder arrangement.

The coextrusion head, according to the invention, has an upper portion containing annular passages within which the structural layers are formed and a lower portion containing the nozzle. Lying between the upper and lower portions and connecting the annular passages to the nozzle are an inside core ring and an outside nozzle ring. The individual layers of the tubular structure are channeled from the bottom junction of the annular passages in the upper portion of the coextrusion head to the inlet into the nozzle by the two rings. The core ring and the nozzle ring are each exchangeable and can be shaped such that, in the bottom junction area, they cut off one or more annular passages, or the feed from those passages, that forms the individual layers, as desired. Thus, for example, instead of a seven-layer tubular structure a tube can be formed having four layers with the barrier layer being on either the inside or outside of the tubular structure. Thus, the joined multilayer tubular structure is transported smoothly while maintaining contact with the wall from the junction area to the nozzle of the coextrusion head.

Because of the most common form of the tubular structures, the upper portion of the coextrusion head has the annular passages, wherein the layers are formed, arranged symmetrically to the annular passage for the middle barrier layer. A jacket structure, which permits a radial arrangement of the annular passages, can be provided for this purpose with the jacket forming concentric annular passages for forming inside and outside carrier layers, regenerated material layers and adhesive layers.

When a symmetrical tubular structure is to be produced, the inside core ring and the outside nozzle ring would have the same cross sectional configuration and dimensions, though being mirror images of one another, with a beveled head segment. The inclination of the bevelled head segment parallels the slope of the facing bottom of the jacket and lies at a predetermined distance therefrom. Each ring has a vertical inside wall which is in alignment with the inlet opening into the nozzle. Thus then, as a result of the coinciding, but mirror image, cross-sectional dimensions of the core and nozzle rings, and the symmetrical jacket structure, no annular passage is obstructed, a multilayer tubular structure of symmetrical layer arrangement, e.g., a seven-layer or five-layer tubular structure, can be manufactured.

However, when either the inside core ring or the outside nozzle ring is such that its beveled head segment bears against the opposing bottom jacket facing, thereby obstructing the corresponding junction area for the material flowing from the passages contained in that portion of the jacket, the extruded multilayered tubular structure does not contain the layers that would have been formed by the obstructed annular passages. Thus, a coextrusion head having an upper portion with a jacket containing five symmetrical annular passages can be adapted to produce a tubular structure of three layers and one having seven annular passages produces a tubular structure of four layers by the simple expedient of exchanging the core ring or the nozzle ring for a ring of a cross-sectional form or dimensions such that it contacts the bottom facing of the jacket thereby obstructing the annular passages contained therein.

When one of the rings is of a form such that it obstructs the flow of material in the junction area, it is advantageous that the inside wall of that ring be formed so that it aligns with the jacket wall defining the middle annular passage and then is at a progressively increasing distance from the facing inside wall of the opposite ring, until this distance is identical with the width of the nozzle inlet opening. In this manner, the multilayer tubular structure passes smoothly between, and flush with, the walls on its inside and outside as far as the inlet opening of the nozzle without being subjected to negative stresses.

Because of the symmetrical structure of the annular passages of the coextrusion head, the upper portion of the head is connected to associated extruders by means of distribution boxes. A distribution box is provided for feed of the carrier layers, the adhesive agent layers and, for a seven-layer extruder, the regenerated material layers. Each distribution box receives material from its associated extruder and feeds the material, through two injection boreholes, to the annular passages that form the layers of the particular material. The paired injection boreholes are arranged one over the other with the injection boreholes in the coextrusion head axially aligned with outlet openings in the distribution box. Only one injection borehole is provided for the barrier layer which is formed in the central annular passage.

This construction permits the coextrusion head, during manufacturing operations, to be fed material from as many as four extruders, while even more extruders, to a maximum of seven extruders, could be used, generally for laboratory operations, by removing the distribution boxes and attaching each extruder directly to a borehole.

The coextrusion head, according to the invention, having one nozzle ring and one core ring, either of which can be a barrier or nonbarrier ring, permits the production of all current multilayer tubular structures. With this arrangement, changing the core ring permits the closing off of the feed from the annular passages that form the inside layers and changing the nozzle ring permits the closing off of the feed for the forming the outside layers of the produced tubular structure. Regardless of the core or nozzle ring that is being used, the combined multilayer tubular structure is transported smoothly and in contact with the rings' walls to the inlet opening of the nozzle in the lower portion of the coextrusion head. The completed tubular structure is then discharged from the nozzle. Thus, once the associated extruder arrangement has been established, it can be maintained unchanged during the production of tubular structures having differing numbers and arrangements of layers.

Other objects, adaptabilities and capabilities will be appreciated and understood by those skilled in the art from the disclosure herein as well as, of course, reduction to practice conforming to such disclosure, reference being had to the accompanying drawings in which:

BRIEF DESCRIPTION OF THE DRAWINGS

FIG. 1 is an oblique view of both the coextrusion head, according to the invention, showing the arrangement of the injection boreholes, and a distribution box;

FIG. 2 is a vertical cross-section of a coextrusion head for production of a seven-layer tubular structure;

DESCRIPTION OF THE PREFERRED EMBODIMENTS

Figures 3, 4:
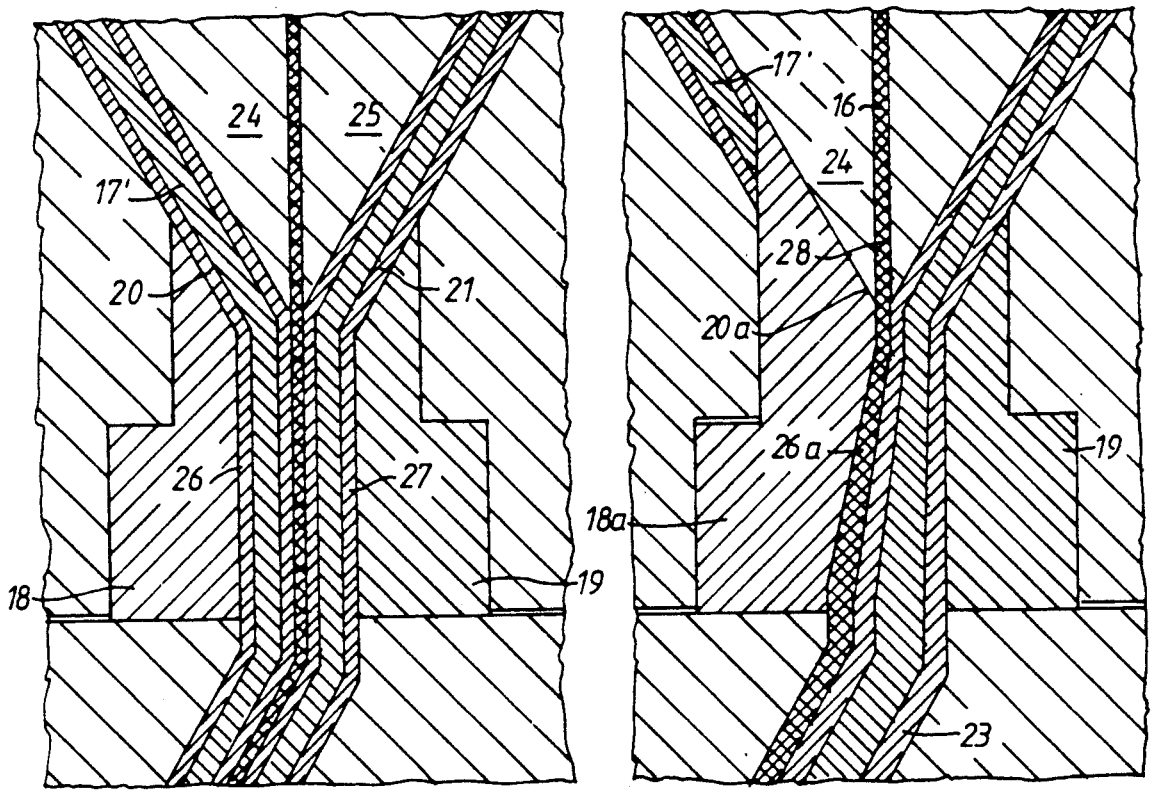
FIG. 3 is a vertical cross-section of the junction area having a core ring and a nozzle ring with identical, but mirror image, cross-section.
FIG. 4 is a vertical cross-section of the junction area where the core ring is of a cross-section such that it obstructs material flow.

A coextrusion head 1, for forming a seven-layer tubular structure, is shown in FIG. 1. The head has two injection boreholes 2 for receiving the material forming the carrier layers, boreholes 3 for adhesive agent layers and boreholes 4 for regenerated material layers, and injection borehole 5 for a barrier layer. The paired injection boreholes 2, 3 and 4 are arranged one over the other and are spaced apart so that they are axially aligned with the spacing of the outlet openings 6 of distribution box 7. A distribution box 7 is associated with each of the pairs of boreholes and provides the interface between an extruder (not shown) and the coextrusion head 1. Each distribution box 7 has an inlet opening 8 and two passages 9 branching to outlet openings 6.

The coextrusion head, as seen in cross-section in FIG. 2, has a jacket 1a comprising a plurality of members that form radial passages. The configuration shown produces a symmetrical seven-layer tubular structure. The seven-layer structure being formed by the concentric passages within the jacket 1a consists of inside and outside carrier layers, formed in passages 10 and 11; regenerated material layers, formed in passages 12 and 13; adhesive agent layers, formed in passages 14 and 15; and a middle barrier layer formed in passage 16. The layers are channeled together, one after the other, in annular passage 17 which is inclined downwardly toward the junction with the middle barrier layer.

The bottom junction area 17a, of the passages forming the layers, is surrounded by an inside core ring 18 and an outside nozzle ring 19, which are arranged exchangeably in the coextrusion head and can have an obstructing or nonobstructing function. The two rings 18 and 19 each have a beveled head segment 20 and 21 wherein the slope of each parallels the facing bottom of the associated jacket Between core ring 18 and nozzle ring 19, the joined multilayer tubular structure is introduced into the inlet opening 22 of nozzle 23, from which the completed multilayer tubular structure is extruded.

FIG. 3 shows a coextrusion head for the production of a seven-layer tubular structure in which the rings 18 and 19 used have an identical cross-sectional form. Their head segments 20 and 21 are spaced from the bottom facings of jacket portions 24 and 25 and their vertical inside walls 26 and 27 are at a spacing from each other which corresponds to the width of inlet opening 22 of nozzle 23.

In FIG. 4, the nonobstructing core ring 18 of FIG. 3 has been exchanged for an obstructing core ring 18a. Head segment 20a, of core ring 18a, engages facing bottom side of jacket portion 24 thereby obstructing the flow of material in corresponding annular passage 17', in which the layers formed in passages 11, 13 and 15 are joined. The inside wall 26a of core ring 18a curves in such a manner that its top is aligned with jacket wall 28 defining the middle annular passage 16 and its bottom is aligned with the inlet opening into nozzle 23, so that the four-layer tubular structure, consisting of an inside barrier layer, engaging adhesive layer, regenerated material layer and outside carrier layer, produced by this arrangement is transported smoothly and flush with the wall to inlet opening 22 of nozzle 23.

Figure 5:
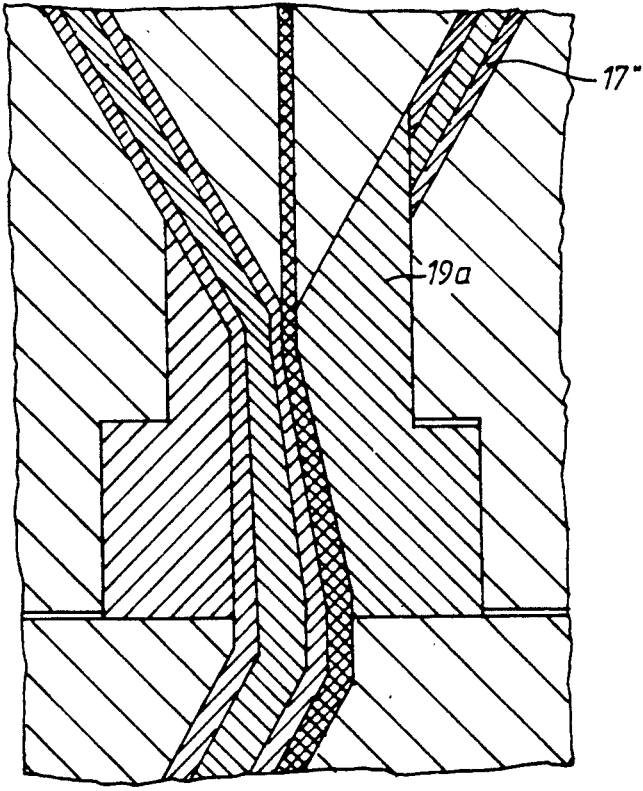
FIG. 5 is a vertical cross-section of the junction area where the nozzle ring is of a cross-section that it obstructs material flow.

In a corresponding manner, FIG. 5 shows the obstruction of material flow in annular passage 17''' by outside nozzle ring 19a. The product of this configuration is a four-layer tubular structure with an outside barrier layer.

The above description of the manufacture of seven-layer and four-layer tubular structures is equally applicable to five-layer and three-layer tubular structures. The coextrusion head for producing a five-layer tubular structure can be obtained by eliminating the inside and outside feed passages in the jacket 24 or by injecting identical material into the regenerated material and carrier layer annular passages 12, 13, 10 and 11 respectively.

Having disclosed my invention, what I claim as new and to be secured by Letters Patent in the United States is:

1. A coextrusion head for the production of multi-layer tubular structures having a maximum of seven layers of plastic material, the tubular structures serving as parison blanks to be further processed using blow molding, comprising:
   an upper portion, said upper portion containing a jacket further comprising members which when assembled into said jacket define longitudinal annular passages wherein layers for the multi-layer tubular structures are formed;
   two inclined annular passages, each of said inclined annular passages having as an upper surface said jacket's bottom facing side and as a lower surface said upper portion's opposing internal walls, portions of said longitudinal annular passages opening into two of said two inclined annular passages;
   an injection borehole for introduction of material into each said longitudinal annular passage in said upper portion;
   a lower portion having a nozzle for extruding the multilayered tabular structure; and
   an inside core ring and an outside nozzle ring exchangeably arranged between said upper portion and said lower portion adjacent where said two inclined annular passages join an inlet opening to said nozzle wherein said inside core ring and said outside nozzle ring can have a nonobstructing function in that their head segments are spaced from said bottom facing side of said jacket to permit material flow in said two inclined annular passages where the layers that form the multi-layer tabular structure are joined or an obstructing function in that said head segment of said inside core ring or of said outside nozzle ring engages said bottom facing side of said jacket thereby preventing the flow of material in a corresponding one of said two inclined annular passages.

2. A coextrusion head as claimed in claim 1, wherein said longitudinal annular passages are arranged symmetrically to a central longitudinal annular passage channeling the middle layer material.

3. A coextrusion head as claimed in claim 2, wherein said inside core ring and said outside nozzle ring have the same, but mirror image, cross-sectional dimensions and shape and further have a beveled head segment, the inclination of said beveled head segment paralleling said bottom facing side of said jacket such that said two inclined annular passages are open to material flow, said inside core ring's and said outside nozzle ring's vertical inside wall being aligned with said nozzle's inlet opening.

4. A coextrusion head as claimed in claim 2, wherein said inside core ring's beveled head segment abuts said bottom facing side of said jacket and obstructs the material flow in one of said two inclined annular passages and said outside nozzle ring having a beveled head segment, the inclination of said beveled head segment paralleling said bottom facing side of said jacket such that one of said two inclined annular passages is open to material flow thereby providing means for producing a tubular structure having an inside layer formed from material flowing in said central longitudinal annular passage.

5. A coextrusion head as claimed in claim 4, wherein said inside wall of said inside core ring is formed so that its top aligns with the jacket wall of said central longitudinal annular passage and subsequently assumes a progressively increasing distance from the facing inside wall of said nozzle ring until said distance coincides with the width of said nozzle's inlet opening.

6. A coextrustion head as claimed in claim 2, wherein said outside nozzle ring's beveled head segment abuts said bottom facing side of said jacket and obstructs the material flow in one of said two inclined annular passages and said inside core ring having a beveled head segment, the inclination of said beveled head segment paralleling said bottom facing side of said jacket such that one of said two inclined annular passages is open to material flow thereby providing means for producing a tubular structure having an inside layer formed from material flowing in said central longitudinal annular passage.

7. A coextrusion head as claimed in claim 6, wherein said inside wall of said outside nozzle ring is formed so that its top aligns with the jacket wall of said central longitudinal annular passage and subsequently assumes a progressively increasing distance from the facing inside wall of said core ring until said distance coincides with the width of said nozzle's inlet opening.

8. A coextrusion head as claimed in claim 2, wherein said injection boreholes are paired for each symmetrical pair of longitudinal annular passages so as to feed material for carrier layers, adhesive agent layers and regenerated material layers, said paired boreholes being mated with a distribution box, each said distribution box having an associated extruder, and a remaining borehole with associated extruder that feeds material to said central longitudinal annular passage.

9. A coextrusion head as claimed in claim 8, wherein said paired injection boreholes are arranged one over the other and aligned axially along said coextrusion head.

10. A coextrusion head as claimed in claim 2, further comprising at least five longitudinal annular passages.

11. A coextrusion head for the production of multi-layer tubular structures having a maximum of seven layers of plastic material, the tubular structures serving as parison blanks to be further processed using blow molding, comprising:
   an upper portion, said upper portion containing a jacket further comprising members which, when assembled into said jacket, define longitudinal annular passages wherein layers for the multilayer tubular structures are formed;
   an inner and an outer inclined annular passage, each of said inclined annular passages having as an upper surface said jacket's bottom facing side and as a lower surface said upper portion's opposing internal walls, said longitudinal annular passages each opening into one or the other of said two inclined annular passages;

an injection borehole for introduction of material into each said longitudinal annular passage in said upper portion;

a lower portion having a nozzle for extruding the multilayered tubular structure; and a set of core rings comprising first and second interchangeable inside core rings and a set of outside nozzle rings comprising first and second interchangeable outside nozzle rings, each said core ring having an outboard facing inner periphery and an inboard facing outer periphery, each said nozzle ring having an outboard facing outer periphery an inboard facing inner periphery, each of said rings being removably receivable between said upper portion an said lower portion, said rings being so received between said upper and lower portions so that for each said set their said outer peripheries bear against at least one of said portions and their said inner peripheries define a flow passage between at least one of said inclined annular passages and said nozzle, said first inside core ring and said first outside nozzle ring when received between said upper and lower portions providing between them an annular passage that connects said two inclined annular passages and said nozzle, said second inside core ring and said first outside nozzle ring when received between said upper and lower portions blocking the inner of said inclined annular passages while providing an annular passage between the outer of said inclined annular passages and said nozzle, and said first inside core ring and said second outside nozzle ring when received between said upper and lower portions blocking the outer of said two inclined annular passages while providing between them an annular passage between the inner of said inclined annular passages and said nozzle.

12. A coextrusion head as claimed in claim 11, wherein said longitudinal annular passages are arranged symmetrically as seen in cross-section to a central longitudinal annular passage channeling a middle layer material.

13. A coextrusion head as claimed in claim 12, wherein said first inside core ring and said first outside nozzle ring have the same but mirror images as seen in cross-section and further having facing beveled head segments, the inclination of each said beveled head segment paralleling said bottom facing side of said jacket so that material flow is not obstructed into said two inclined annular passages, said first inside core ring and said first outside nozzle ring each having vertical annular inside walls which are facing each other and are aligned with said nozzle's inlet opening.

14. A coextrusion head as claimed in claim 12, wherein said injection boreholes are paired for each symmetrical pair of longitudinal annular passages to feed material for carrier layers, adhesive agent layers and regenerated material layers, said paired boreholes being mated with a distribution box, each said distribution box having an associated extruder, and a remaining borehole with associated extruder being provided that feeds material to said central longitudinal annular passage.

15. A coextrusion head for producing multilayer tubular structures comprising parison blanks which are further processed using blow molding, the coextrusion head comprising:

a jacket defining a plurality of concentric inboard and outboard annular passage means for receiving, conducting and confining spaced apart different flows of plastic materials supplied from injection means for injecting said plastic materials into said plurality of concentric passage means;

said jacket further defining an outer annular passage means which converges inwardly and joins each of the outboard annular passage means of said plurality of annular passage means to receive and join said flows from said outboard passage means as a joined outboard lamina therein, and an inner annular passage means which diverges outwardly and joins each of the inboard annular passage means of said plurality of annular passage means to receive and join said flows therefrom as a joined inboard lamina therein;

said jacket containing inside and outside ring means for receiving and joining together between them said joined outboard lamina flows and said joined inboard lamina flows;

said inside and outside ring means each being independently and readily replaceable by a selected one of two interchangeable further ring means for selectively annularly blocking either said outboard passage means or said inboard passage means so that lamina which would flow from said outboard passage means or from said inboard passage means is selectively blocked while lamina continues flowing between said ring means from the other of such selected inboard or outboard passage means.

16. A coextrusion head according to claim 15, wherein said jacket defines a further annular passage means for receiving a further flow of plastic material from said injection means, said further annular passage disposed concentrically and centrally relative to said plurality of annular passage means, said further passage means and said further ring means being so constructed and arranged that said further passage means cannot be selectively blocked by either of said further ring means, said further passage means being connected to a source of plastic material injection means adapted to form a barrier layer selectively on the interior or the exterior of said parison blanks depending upon whether said outboard or said inboard passage means is blocked by a selected further said ring means.

* * * * *